US010223652B2

United States Patent
Chan et al.

(10) Patent No.: US 10,223,652 B2
(45) Date of Patent: Mar. 5, 2019

(54) SYSTEMS AND METHODS FOR AN ATTRIBUTE GENERATOR TOOL WORKFLOW

(71) Applicant: Capital One Financial Corporation, McLean, VA (US)

(72) Inventors: Shirley Chan, Dunn Loring, VA (US); Karen Bernhard, Richmond, VA (US); Thomas Hodgson, Glen Allen, VA (US)

(73) Assignee: Capital One Services, LLC, McLean, VA (US)

(*) Notice: Subject to any disclaimer, the term of this patent is extended or adjusted under 35 U.S.C. 154(b) by 747 days.

(21) Appl. No.: 14/680,883

(22) Filed: Apr. 7, 2015

(65) Prior Publication Data

US 2015/0286946 A1 Oct. 8, 2015

Related U.S. Application Data

(60) Provisional application No. 61/976,611, filed on Apr. 8, 2014.

(51) Int. Cl.
*G06Q 10/06* (2012.01)
*G06F 17/00* (2006.01)
*G06N 5/02* (2006.01)

(52) U.S. Cl.
CPC .................. *G06Q 10/06* (2013.01)

(58) Field of Classification Search
CPC ..... G06Q 10/06; G06F 8/30; G06F 17/30371; G06F 8/35; G06F 8/73

(Continued)

(56) References Cited

U.S. PATENT DOCUMENTS 7,778,966 B2* 8/2010 Balassanian ...... G06F 17/30067
707/610
8,440,170 B2* 5/2013 Stroppolo ............ A61K 9/2072
424/10.2

(Continued)

OTHER PUBLICATIONS

An Authenticated Trust and Reputation Calculation and Management System for Cloud and Sensor Networks Integration Chunsheng Zhu; Hasen Nicanfar; Victor C. M. Leung; Laurence T. Yang IEEE Transactions on Information Forensics and Security Year: 2015, vol. 10, Issue: 1 pp. 118-131 IEEE Journals & Magazines.*

(Continued)

*Primary Examiner* — Michael B Holmes
(74) *Attorney, Agent, or Firm* — Finnegan, Henderson, Farabow, Garrett, & Dunner, LLP (57) ABSTRACT

The disclosed embodiments generally relate to systems and methods for computerized decisioning, and more particularly, to systems and methods for standardized coding and deployment of attributes for financial decisioning systems coded once and deployed to multiple decisioning systems and environments. Consistent with disclosed embodiments, an attribute management system may include one or more memory devices storing instructions, and one or more hardware processors configured to execute the instructions to perform operations. Upon executing the instructions, the processors may receive a financial service request, and identify a decisioning system for processing the request. The processors may determine that an attribute is required for processing the request using the decisioning system. Then, the processors may initiate an attribute calculation service for determining an attribute value for the attribute. The processors may receive the attribute value from the attribute calculation service, and process the financial service request using the received attribute value.

27 Claims, 8 Drawing Sheets

(58) Field of Classification Search
USPC .......................................................... 706/46
See application file for complete search history.

(56) References Cited

U.S. PATENT DOCUMENTS

| | | | | |
|---|---|---|---|---|
| 8,611,865 | B1* | 12/2013 | Balannik | H04M 1/7255 |
| | | | | 455/413 |
| 8,695,075 | B2* | 4/2014 | Anderson | H04L 9/3213 |
| | | | | 726/8 |
| 8,745,205 | B2* | 6/2014 | Anderson | H04L 9/3213 |
| | | | | 709/224 |
| 8,768,715 | B2* | 7/2014 | Penick | G06F 17/30286 |
| | | | | 705/1.1 |
| 8,812,647 | B1* | 8/2014 | Jain | G06Q 10/10 |
| | | | | 709/223 |
| 8,856,185 | B2* | 10/2014 | Balassanian | G06F 17/30067 |
| | | | | 707/797 |
| 9,035,879 | B2* | 5/2015 | Vendrow | G06F 3/023 |
| | | | | 345/156 |
| 9,100,542 | B2* | 8/2015 | Umehara | H04L 12/1818 |
| 9,158,799 | B2* | 10/2015 | Morozov | G06F 17/30303 |
| 9,274,759 | B2* | 3/2016 | Ohuchi | G06F 8/71 |
| 9,310,902 | B2* | 4/2016 | Vendrow | G06F 3/023 |
| 9,438,855 | B2* | 9/2016 | Umehara | H04L 12/1818 |
| 9,619,579 | B1* | 4/2017 | Courbage | G06F 17/30943 |
| 9,697,453 | B2* | 7/2017 | Augustinowicz | |
| | | | | G06K 19/07327 |
| 9,697,543 | B2* | 7/2017 | Jain | G06Q 30/0276 |
| 9,852,165 | B2* | 12/2017 | Morozov | G06F 17/30303 |
| 2005/0004860 | A1* | 1/2005 | Pretell | G06Q 40/02 |
| | | | | 705/38 |
| 2014/0229363 | A1* | 8/2014 | Orloff | G06Q 40/025 |
| | | | | 705/38 |
| 2015/0046705 | A1* | 2/2015 | Campbell | H04L 63/0428 |
| | | | | 713/165 |
| 2015/0286946 | A1* | 10/2015 | Chan | G06Q 10/06 |
| | | | | 706/46 |
| 2015/0353005 | A1* | 12/2015 | Hodgson | G06F 3/016 |
| | | | | 345/156 |
| 2018/0189871 | A1* | 7/2018 | Lennert | G06Q 40/025 |

OTHER PUBLICATIONS

Investigation and management solution for privacy identification and electrical energy theft A. Kannan; A. Sri Krishnan; S. Munni Krishnan; K. V. Bindu; B. Justus Rabi 2011 International Conference on Electronics, Communication and Computing Technologies Year: 2011 pp. 73-77 IEEE Conferences.*

Disaster management system based on GIS web services R. Jeberson Retna Raj; T. Sasipraba Recent Advances in Space Technology Services and Climate Change 2010 (RSTS & CC-2010) Year: 2010 pp. 252-261 IEEE Conferences.*

The Study on Spatial Data of Across-district Emergency Response Information Sharing System Jing Liu 2008 International Seminar on Future Information Technology and Management Engineering Year: 2008 pp. 547-550 IEEE Conferences.*

D.-M. Han and J.-H. Lim: Design and Implementation of Smart Home Energy Management Systems based on ZigBee 2010 IEEE Design and Implementation of Smart Home Energy Management Systems based on ZigBee Dae-Man Han and Jae-Hyun Lim, Member, IEEE pp. 1417-1425 IEEE.*

ACM(DL) Digital Library Astrolabe: A robust and scalable technology for distributed system monitoring, management, and data mining Robbert Van Renesse, Kenneth P. Birman, Werner Vogels pp. 164-206 ACM Transactions on Computer Systems TOCS) TOCS Homepage archive vol. 21 Issue 2, May 2003.*

IEEE Transactions on Industrial Informatics, vol. 10, No. 2, May 2014 Ubiquitous Data Accessing Method in IoT-Based Information System for Emergency Medical Services pp. 1578-1586 Boyi Xu, Li Da Xu, Hongming Cai, Cheng Xie, Jingyuan Hu, and Fenglin Bu IEEE.*

* cited by examiner

SYSTEMS AND METHODS FOR AN ATTRIBUTE GENERATOR TOOL WORKFLOW

CROSS-REFERENCE TO RELATED APPLICATIONS

This application claims priority from U.S. Provisional Application No. 61/976,611, filed Apr. 8, 2014, which is hereby incorporated by reference in the present application.

FIELD OF DISCLOSURE

The disclosed embodiments generally relate to systems and methods for computerized decisioning, and more particularly, to systems and methods for standardized coding and deployment of attributes for decisioning systems.

BACKGROUND

Computerized decisioning systems are becoming increasingly leveraged by organizations to support decision making activities associated with the organizations. For instance, organizations use these decisioning systems to compile useful information concerning organizational activities, analyze the information, and/or propose decisions stemming from the organizational activities. In the financial sector, for example, financial institutions use computerized decisioning systems to conduct market analyses, monitor for fraud detection, determine credit limit approvals, make investment decisions, etc.

These computerized decisioning systems use "attributes" when performing operations for an organization. These attributes define and/or summarize properties of an underlying object, activity, customer, etc. For example, a credit attribute may be generated by a financial institution to summarize raw credit data for an individual into one value that can be leveraged for credit decisioning. Currently, however, computer programmers must "code" the same attributes across multiple environments, such as an analytical environment (e.g., where the attributes are used for internal testing) and a production environment (e.g., where the same attributes are used after passing internal testing to make decisions that impact an entity external to the financial institution, like a credit-seeking consumer). Further, computer programmers must also "code" the same attributes across different decisioning systems (e.g., marketing systems, application processing systems, account management systems, etc.).

Thus, attributes must currently be coded and tested multiple times between the analytical to production rollout phases across multiple systems. This leads to long lead-times to put an attribute to use in production environments. Further, having to code the same attribute multiple times increases the chance of errors. Also, coding the same attribute multiple times may lead to inconsistent attribute data between analytical and production environments, as well as between different decisioning systems (e.g., marketing, application, account management, etc.). This in turn can lead to a suboptimal customer experience.

SUMMARY

In the following description, certain aspects and embodiments of the present disclosure will become evident. It should be understood that the disclosure, in its broadest sense, could be practiced without having one or more features of these aspects and embodiments. Specifically, it should also be understood that these aspects and embodiments are merely exemplary. Moreover, although disclosed embodiments are discussed in the context of financial decisioning systems and environments for ease of discussion, it is to be understood that the disclosed embodiments are not limited to any particular industry. Instead, disclosed embodiments may be practiced by any entity in any industry that would benefit from standardized coding and deploying common attributes across multiple systems and environments.

Certain disclosed embodiments provide systems and methods for standardized coding and deployment of common attributes across multiple financial decisioning systems and production environments. For example, certain disclosed embodiments may enable coding attributes only once and deploying them to multiple decisioning systems and environments (e.g., exploratory, sandbox, and production stages), rather than the current state of having to code and deploy the same attribute multiple times. Certain disclosed embodiments may, with the combination of an attribute tool and an improved workflow disclosed below, be able to standardize the attributes to allow coding the attributes once and deploying them multiple times. Specifically, aspects of the disclosed embodiments may also standardize the attribute creation in an attribute generator tool, and leverage this tool to generate attributes for all decisioning systems in production. In addition, in disclosed embodiments, the same attribution code may be promoted through different environments (e.g., exploratory, sandbox, and production), rather than being re-coded separately for each stage of production. For example, an attribute coded for the analytical phase (e.g., early coding and testing) can be pushed through all stages of production to the production phase (e.g., where the code may be used or relied on in the marketplace) for all types of decisioning systems, to increase data consistency and speed to market.

Other aspects of the disclosed embodiments are set forth below in this disclosure. For example, the disclosed embodiments may include a system for attribute management. The system may include, for example, one or more memory devices storing instructions and one or more processors configured to execute the instructions to perform operations. Upon executing the instructions, the processors may receive a financial service request, and identify a decisioning system for processing the request. The processors may determine that an attribute is required for processing the request using the decisioning system. The processors may further initiate an attribute calculation service for determining an attribute value for the attribute. The processors may further receive the attribute value from the attribute calculation service, and process the financial service request using the received attribute value.

The disclosed embodiments also include a computer-implemented method for attribute management. The method may include, for example, receiving a financial service request, and identifying a decisioning system for processing the request. The method may also include determining, via one or more processors, that an attribute is required for processing the request using the decisioning system. The method may also continue with initiating an attribute calculation service for determining an attribute value for the attribute. The method may also include receiving the attribute value from the attribute calculation service, and processing the financial service request using the received attribute value.

In accordance with additional embodiments of the present disclosure, a computer-readable medium is disclosed that stores instructions that, when executed by a processor(s), causes the processor(s) to perform operations consistent with one or more disclosed methods.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
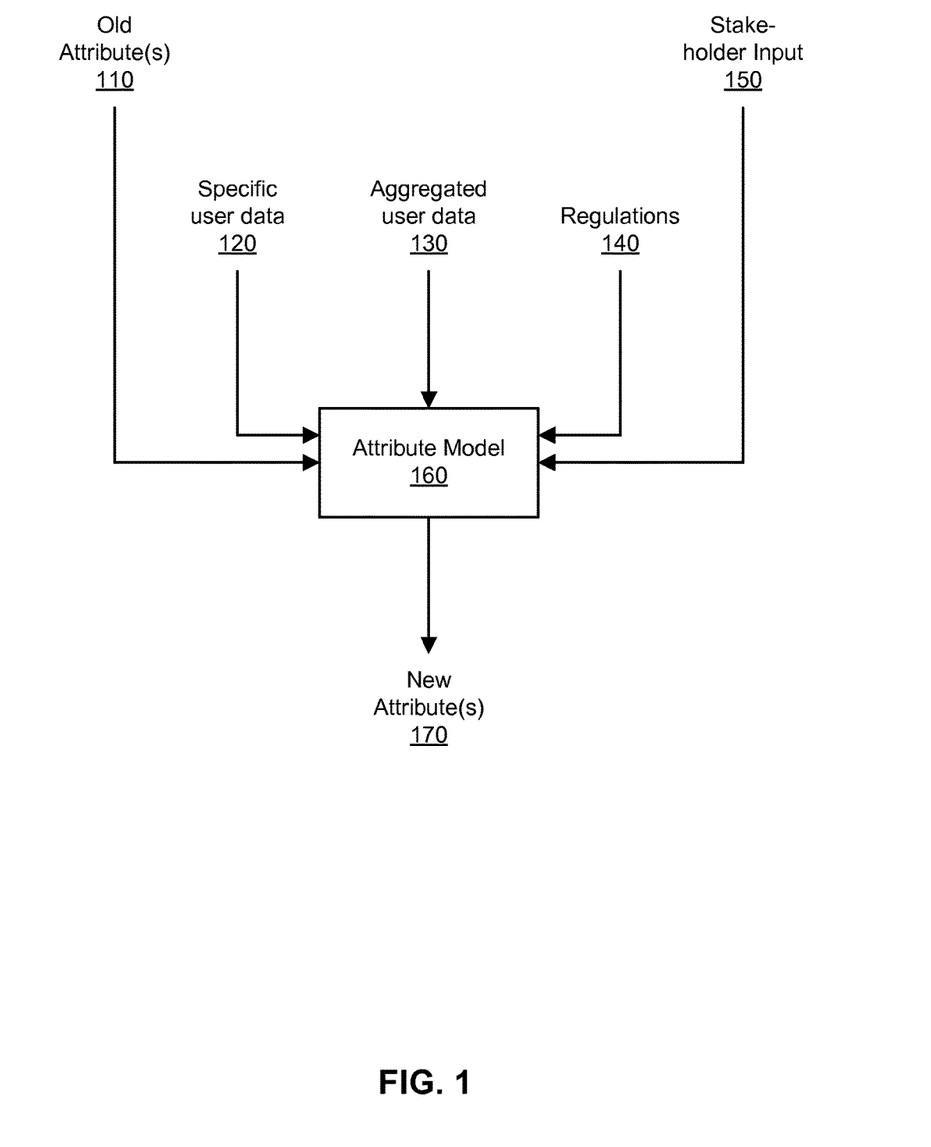
FIG. 1 is a block diagram of an exemplary attribute calculation service, consistent with disclosed embodiments.

FIG. 1 is a block diagram of an exemplary attribute calculation service, consistent with disclosed embodiments. In some embodiments, a financial institution (e.g., any entity associated with the financial services entity) may receive a request for a financial service offered by the financial institution. The financial request may be from a consumer, a broker, a merchant, a financial analyst, an employee of the financial institution, etc. The request could correspond to any financial service including but not limited to an application for a loan, mortgage, or other form of credit, an account opening or closing request, a transaction request (e.g., deposit, withdrawal, money transfer, etc.), a card transaction authorization message (e.g., as part of a credit or debit transaction), a request related to managing an investment asset or asset portfolio, etc. The financial institution may rely on one or more "attributes" to analyze and/or generate a decision on how to process and respond to the financial service request.

For example, a credit attribute may be a calculation that may summarize raw credit data for an individual into one value that can be leveraged for credit decisioning by the financial institution. A simple example of a credit attribute is the number of credit trades associated with the individual. In one embodiment, if an individual had three credit cards, one mortgage, one student loan, and two auto trades, the summarized attribute number of credit trades may be "7." In other embodiments, however, an attribute may comprise complex summarizations due to, for example in the context of credit decisioning, the amount of information available to the financial institution from different credit data sources. A financial institution may utilize such a credit attribute to make decisions regarding the financial services offered to the individual. For example, based on the credit attribute in the above example, the financial institution may determine whether to grant a credit, loan, or mortgage application, whether to alter an interest rate, term, principal amount etc. in order to approve a credit request, whether to process an account opening or closing request, whether to process a transaction request (e.g., deposit, withdrawal), whether to approve a card transaction authorization request (e.g., as part of a credit or debit transaction), whether to perform investment actions related to managing an investment asset or asset portfolio, etc.

In some embodiments an attribute may be calculated according to an attribute model 160. Such a model may utilize a combination of mathematical equations or formulas, artificial intelligence logic, fuzzy logic, pattern recognition techniques, simulated annealing, non-linear dynamical systems processing, or other techniques for operating on input data. It is to be understood that an attribute may depend on any known algorithmic technique for manipulating data, and may operate on varied input data, such as any financial data, personal data, aggregate data, regulatory inputs, company policies, etc. Examples of such data include, but are not limited to: (i) other/old attributes 110, (ii) user data 120 corresponding to a specific user requesting a financial service, (iii) aggregated user data 130 associated with a plurality of users, (iv) statutes, laws, regulations, or company policies 140, (v) stakeholder input 150 (e.g., input from a shareholder, broker, financial intermediary, investment institution, etc.), etc. The value of a new attribute 170 may be calculated using the input data and the attribute model 160 corresponding to the attribute.

Figure 2:
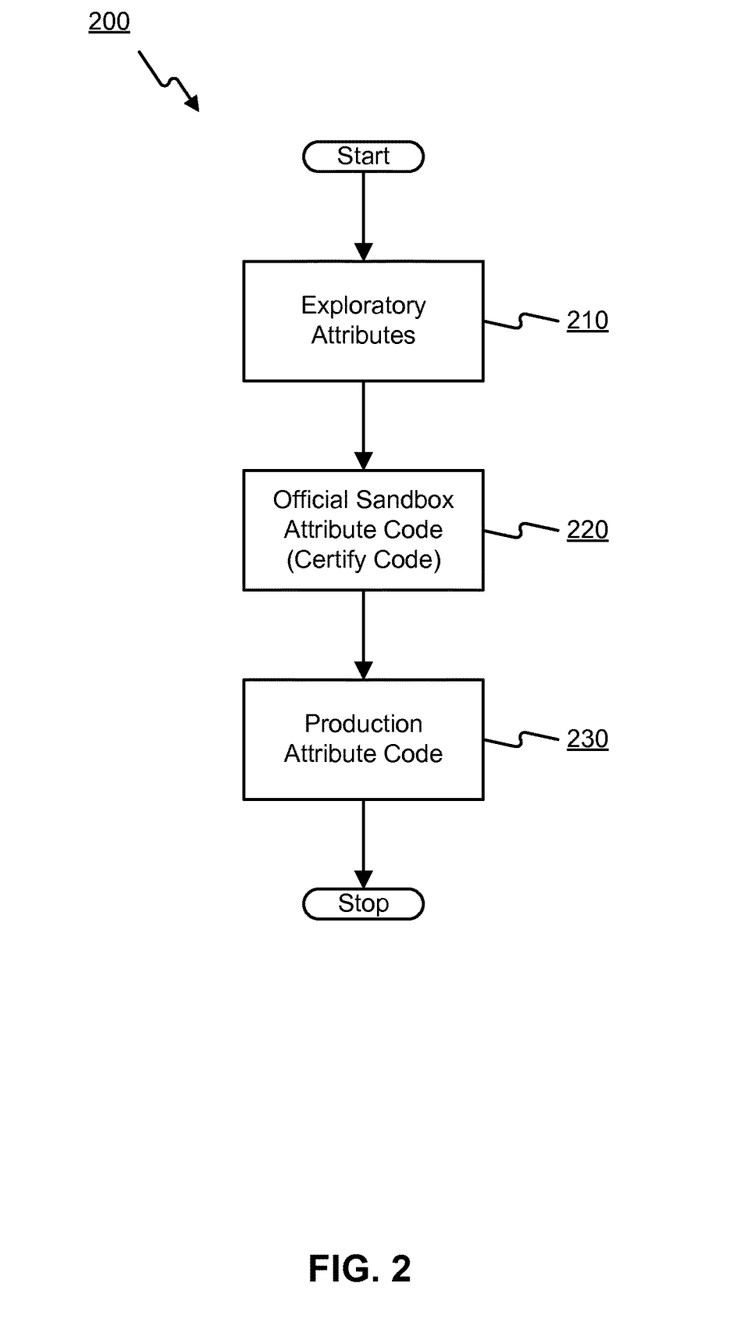
FIG. 2 is a flowchart of an exemplary process for attribute coding, consistent with disclosed embodiments.

FIG. 2 is a flowchart of an exemplary process 200 for attribute coding, consistent with disclosed embodiments. In some embodiments, an attribute model may be proposed for experimentation purposes. The attribute model may be required to pass certain certification tests at one or more stages of production such that, once certified, the attribute model may become promoted from the exploratory stage to the sandbox and, eventually, become published for utilization in "production"-level assignment. For example, at step 210, a system associated with the financial institution (e.g., attribution calculation server(s) 430 and/or financial service provider device 420) may receive a definition for an attribute as an exploratory attribute. The definition may be received from, for example, a user who is an employee, programmer, or analyst at the financial institution. In some embodiments, the system may receive an attribute name and attribute model for the attribute from the user. For example, the attribute model may be specified in the form of source code implementing the algorithmic techniques constituting at least a part of the attribute model. The system may also receive a request for the attribute model (e.g., code associated with the attribute model) to be included in a memory space storing exploratory attributes for testing. In some embodiments, computing security policies may be effected such that the attribute-sponsoring user may alone be able to test, modify, analyze, or otherwise manipulate the source code implementing the attribute model for the attribute in the exploratory space. According to some embodiments, the exploratory source code associated with the attribute model may be encrypted for computing security purposes.

At step 220, computing and memory resources may be allocated within a distributed computing system for testing the attribute model. For example, a sample dataset may be provided for testing from a database storing input data appropriate to the attribute model. The source code, computing and memory resources may be "sandboxed," such that no other parts of the computing system can affect, or be affected by, computing operations for testing the attribute model. The source code may be compiled, and the executed code may be tested. Modifications to the source code in view of the test results may also be performed within the sandbox. In some embodiments, computing security policies may be effected such that a test or compliance team (e.g., internal to the financial institution) may be able to test, modify, analyze, or otherwise manipulate the source code implementing the attribute model for the attribute in the sandbox, but no requests from a user outside the test or compliance team may be processed by the attribute source code. In some embodiments, the test or compliance team may test the sandboxed source code not only for computer security of the source code, but also for the analytical value (e.g., a measure of the attribute's ability to convey useful information concerning organizational activities for decisioning purposes and/or financial implications) of the attribute represented by the attribute model. According to some embodiments, the sandboxed source code associated with the attribute model may be encrypted for computing security purposes. After testing in the sandbox, the attribute model may be deemed critical and certified, allowing the code to be promoted to the next stage of production (step 230). For example, the attribute model may be certified and labeled "production"-ready such that the source code, or compiled executable, may be provided for processing real-world financial service requests. In some embodiments, the source code and/or executable may be encrypted for computing security purposes. This "production" attribute code may be distributed to one or more computers configured to provide attribute calculation services.

Figure 3A:
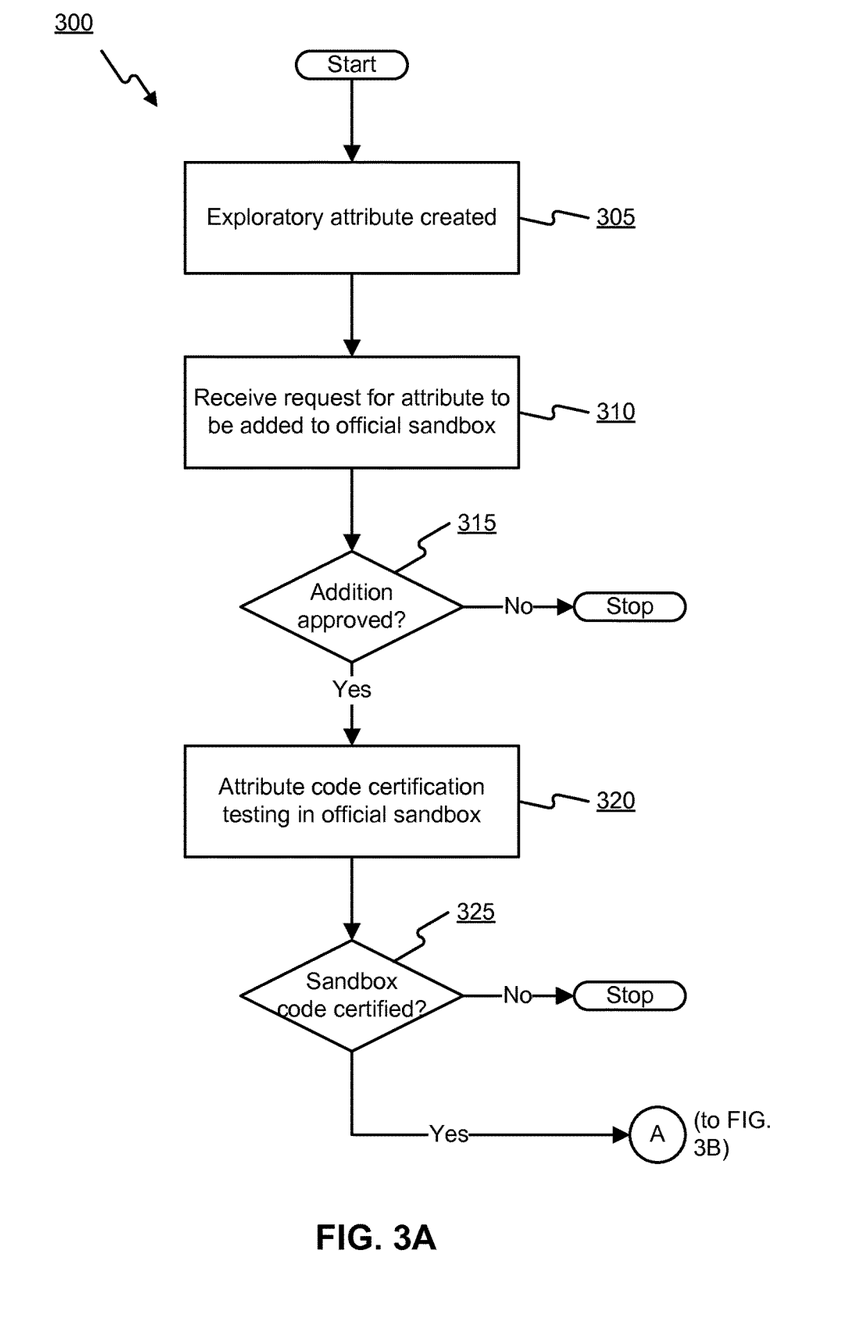
FIGS. 3A-B are flowcharts of an exemplary process for attribute production, consistent with disclosed embodiments.
Figure 3B:
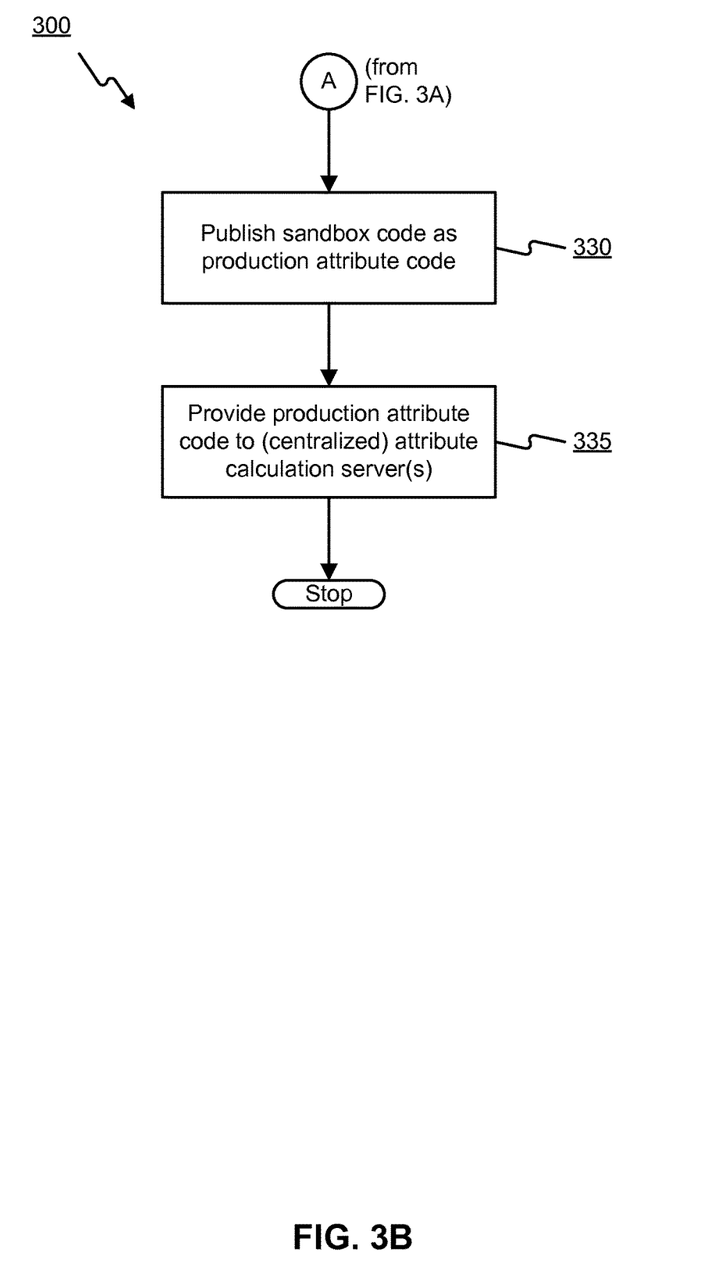

FIGS. 3A-B are flowcharts of an exemplary process 300 for attribute production, consistent with disclosed embodiments. With reference to FIG. 3A, at step 305, a system associated with a financial institution (e.g., attribution calculation server(s) 430 and/or financial service provider device 420) may create an exploratory attribute. At step 310, the system may receive a request for the attribute to be added to the official sandbox of the financial institution. If the addition is approved (step 315; YES), the exploratory source code corresponding to the attribute may be included in a sandboxed computing system. At step 320, the source code may be tested for certification in the official sandbox. Testing may include, for example, ensuring that there are no vulnerabilities in the code itself, that the code complies with one or more coding practices and/or guidelines, and that the values provided by the attribute model 160 provide a financially meaningful signal on which to base financial decisions. The source code may be modified during sandboxed testing. At step 325, if the source code becomes certified, the source code may be "published." For example, with reference to step 330 at FIG. 3B, the source code and/or a compiled and executable version of the source code may be promoted to the production environment such that it becomes published as production attribute code. Continuing the example further, the source code or executable may be stored in a central library of production attribute code for use by one or more computers configured to provide attribute calculation services. The library may be indexed and regularly updated to ensure that all financial decisioning system utilize consistent and uniform attributes and corresponding attribute models. At step 335, the production attribute code may be provided to all computing systems that provide attribute calculation services, such as (centralized) attribute calculation server(s) dedicated to providing attribute calculation services. In some embodiments, in the process of updating attribute calculation services, each attribute model being utilized may be checked periodically to determine whether an updated attribute model is available for the attribute, or if the attribute has been superseded by a different attribute or attribute version.

Figure 4:
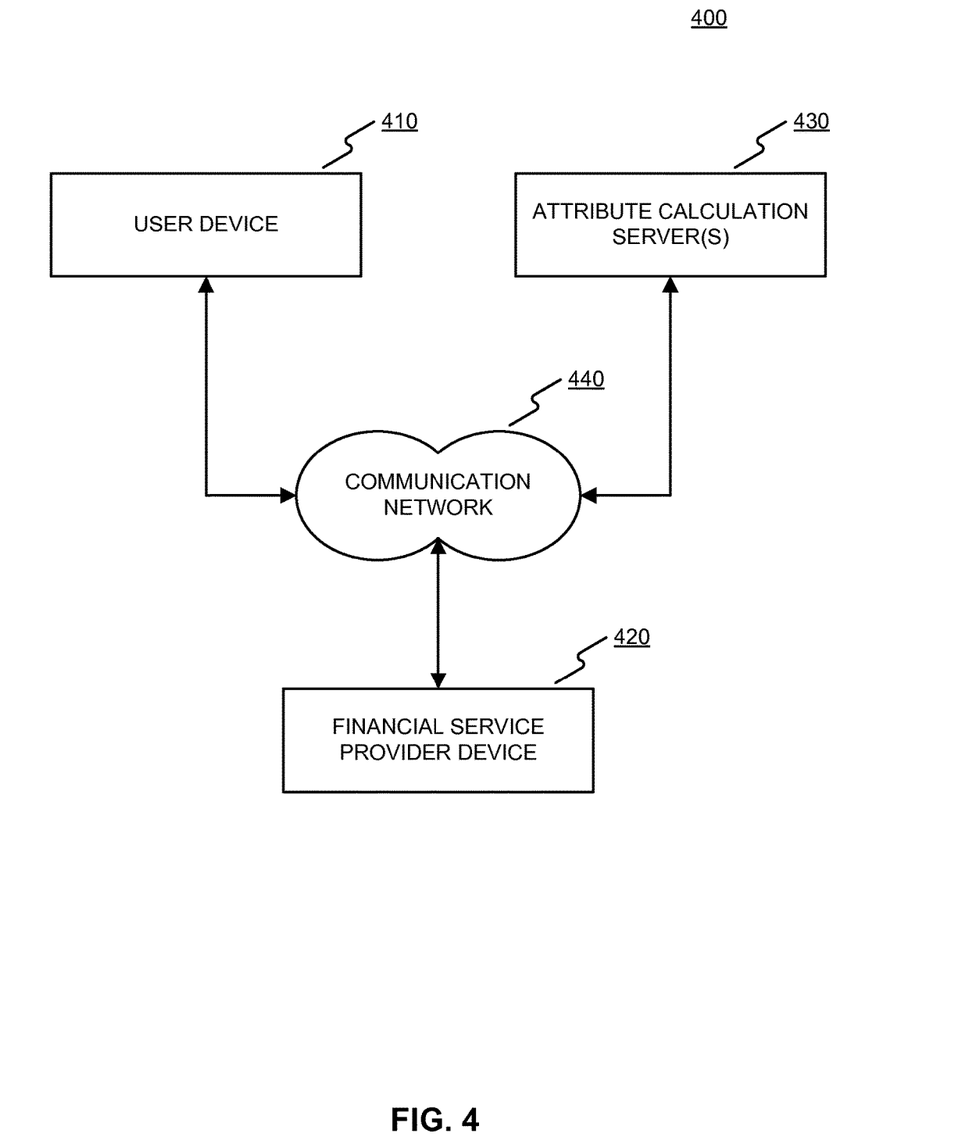
FIG. 4 is a block diagram of an exemplary system, consistent with disclosed embodiments.

FIG. 4 shows a diagram of an exemplary system 400, consistent with disclosed embodiments. As shown in FIG. 4, system 400 may include a user device 410, a financial service provider device 420, and a communication network 440 to facilitate communication among the components of system 400. The components and arrangement of the components included in system 400 may vary. Thus, system 400 may further include other components that perform or assist in the performance of one or more processes consistent with the disclosed embodiments. The components and arrangements shown in FIG. 4 are not intended to limit the disclosed embodiments, as the components used to implement the disclosed processes and features may vary.

In accordance with disclosed embodiments, a system 400 may include a financial service provider (FSP) device 420. FSP device 420 may be a system associated with a financial service provider (not shown), such as a bank, a credit card company, a credit bureau, a lender, brokerage firm, or any other type of financial service entity that generates, provides, manages, maintains financial service accounts, etc. for one or more individuals or entities. FSP device 420 may be one or more computing systems that are configured to execute software instructions stored on one or more memory devices to perform one or more operations consistent with the disclosed embodiments. For example, FSP device 420 may include one or more memory device(s) storing data and software instructions and one or more hardware processor(s) configured to use the data and execute the software instructions to perform server-based functions and operations known to those skilled in the art. FSP device 420 may include one or more general-purpose computers, mainframe computers, or any combination of these types of components.

In certain embodiments, FSP device 420 may be configured as a particular apparatus, system, and the like based on the storage, execution, and/or implementation of the software instructions that perform one or more operations consistent with the disclosed embodiments. FSP device 420 may be standalone, or it may be part of a subsystem, which may be part of a larger system. For example, FSP device 420 may represent distributed servers that are remotely located and communicate over a network (e.g., communication network 440) or a dedicated network, such as a LAN, for a financial service provider. An exemplary computing system consistent with FSP 420 is discussed in additional detail with respect to FIG. 5, below.

FSP device 420 may include or may access one or more storage devices (e.g., memory 530 and/or database 540) configured to store data and/or software instructions used by one or more processors of FSP device 420 to perform operations consistent with disclosed embodiments. For example, FSP device 420 may include memory 530 configured to store one or more software programs that performs various functions when executed by a processor. The disclosed embodiments are not limited to separate programs or computers configured to perform dedicated tasks. For example, FSP device 420 may include memory that stores a single program or multiple programs. Additionally, FSP device 420 may execute one or more programs located remotely from FSP device 420. For example, FSP device 420 may access one or more remote programs stored in memory included with a remote component that, when executed, perform operations consistent with the disclosed embodiments. In certain aspects, FSP device 420 may include server software that generates, maintains, and provides services associated with the financial service industry. In other aspects, FSP device 420 may connect separate server(s) or similar computing devices that generate, maintain, and provide services associated with financial data for a financial service provider associated with FSP device 420.

System 400 may also include one or more attribute calculation (AC) servers 430. AC server 430 may be a system associated with a financial service provider (not shown), such as a bank, a credit card company, a credit bureau, a lender, brokerage firm, or any other type of financial service entity that generates, provides, manages, maintains financial service accounts, etc. for one or more users. For example, AC server 430 may be an internal system to a financial service provider (e.g., part of FSP device 430). In other embodiments, AC server 430 may be associated with a third-party to the financial service provider associated with FSP device 430, such as a credit agency, another financial service provider associated with a common financial transaction, etc.

AC server 430 may be one or more computing systems configured to execute software instructions stored on one or more memory devices to perform one or more operations consistent with the disclosed embodiments. For example, AC server 430 may include one or more memory device(s) storing data and software instructions and one or more hardware processor(s) configured to use the data and execute the software instructions to perform server-based functions and operations known to those skilled in the art. AC server 430 may include one or more general-purpose computers, mainframe computers, or any combination of these types of components.

In certain embodiments, AC server 430 may be configured as a particular apparatus, system, and the like based on the storage, execution, and/or implementation of the software instructions that perform one or more operations consistent with the disclosed embodiments. AC server 430 may be standalone, or it may be part of a subsystem, which may be part of a larger system. For example, AC server 430 may represent distributed servers that are remotely located and communicate over a network (e.g., communication network 440) including a dedicated network, such as a LAN, for a financial service provider. An exemplary computing system consistent with AC server 430 is discussed in additional detail with respect to FIG. 5, below.

AC server 430 may include or have access to one or more storage devices configured to store data and/or software instructions used by one or more processors of AC server 430 to perform operations consistent with disclosed embodiments. For example, AC server 430 may include memory 530 configured to store one or more software programs that performs various functions when executed by a processor. The disclosed embodiments are not limited to separate programs or computers configured to perform dedicated tasks. For example, AC server 430 may include memory that stores a single program or multiple programs. Additionally, AC server 430 may execute one or more programs located remotely from AC server 430. For example, AC server 430 may access one or more remote programs stored in memory included with a remote component that, when executed, perform operations consistent with the disclosed embodiments. In certain aspects, AC server 430 may include server software that generates, maintains, and provides services associated with decisioning in the financial industry. In other aspects, AC server 430 may connect separate server(s) or similar computing devices that generate, maintain, and provide decisioning services associated with financial data for a financial service provider associated with AC server 430.

System 400 may further include one or more user devices 410. A user may operate a user device 410, which may be a desktop computer, laptop, tablet, smartphone, multifunctional watch, pair of multifunctional glasses, tracking device, or any suitable device with computing capability. User device 410 may include one or more processor(s) and memory device(s) known to those skilled in the art. For example, user device 410 may include memory device(s) that store data and software instructions that, when executed by one or more processor(s), perform operations consistent with the disclosed embodiments. In one aspect, user device 410 may have a financial application installed thereon, which may enable user device 410 to communicate with FSP device 420 via communication network 440. For instance, user device 410 may be a smartphone or tablet (or the like) that executes a stored mobile app that performs online banking operations. In other embodiments, user device 410 may connect to FSP device 420 through use of browser software stored and executed by user device 410. User device 410 may be configured to execute software instructions that allow a user to access information stored in FSP 420, such as, for example, financial information related to recent purchase transactions, financial discounts, financial statements, account information, rewards program information, credit and loan services, and the like. Additionally, user device 410 may be configured to execute software instructions that initiate and conduct transactions with FSP device 420, such as, for example, ATM withdrawals, wire transfers, debit card PIN resets, call center transactions, or any other activity that implications financial decisioning. An exemplary computer system consistent with user device 410 is discussed in additional detail with respect to FIG. 5.

A user may operate user device 410 to perform one or more operations consistent with the disclosed embodiments. In one aspect, a user may be a customer of financial service provider corresponding to FSP device 420. For instance, a financial service provider may maintain a financial service account (e.g., checking account, savings account, debit card account, or credit card account) for the user that the user may use to purchase goods and/or services, thereby implicating financial decisioning associated with authorizing transaction request. Additionally or alternatively, the user may use user device 410 and the financial service account (for example, through a mobile application installed on user device 410) to withdraw cash from an ATM, contact a customer call center, transfer or wire money, reset their debit account PIN, or any other activity that implications financial decisioning, such as whether the activity may be fraudulent (e.g., fraud detection).

Network 440 may comprise any type of computer networking arrangement used to exchange data. For example, network 440 may be the Internet, a private data network, a virtual private network using a public network, a WiFi network, a LAN or WAN network, and/or other suitable connections that may enable information exchange among various components of the system 400. Network 440 may also include a public switched telephone network ("PSTN") and/or a wireless cellular network. Network 440 may be a secured network or unsecured network. In other embodiments, one or more components of system 400 may communicate directly through a dedicated communication link(s), such as links between user device 410, financial service provider device 420, and AC server 430.

Other components known to one of ordinary skill in the art may be included in system 400 to process, transmit, provide, and receive information consistent with the disclosed embodiments. In addition, although not shown in FIG. 4, components of system 400 may communicate with each other through direct communications. Direct communications may use any suitable technologies, including, for example, wired technologies (e.g., Ethernet, PSTN, etc.), wireless technologies (e.g., Bluetooth™, Bluetooth LE™, WiFi, near field communications (NFC), etc.), or any other suitable communication methods that provide a medium for transmitting data between separate devices.

Figure 5:
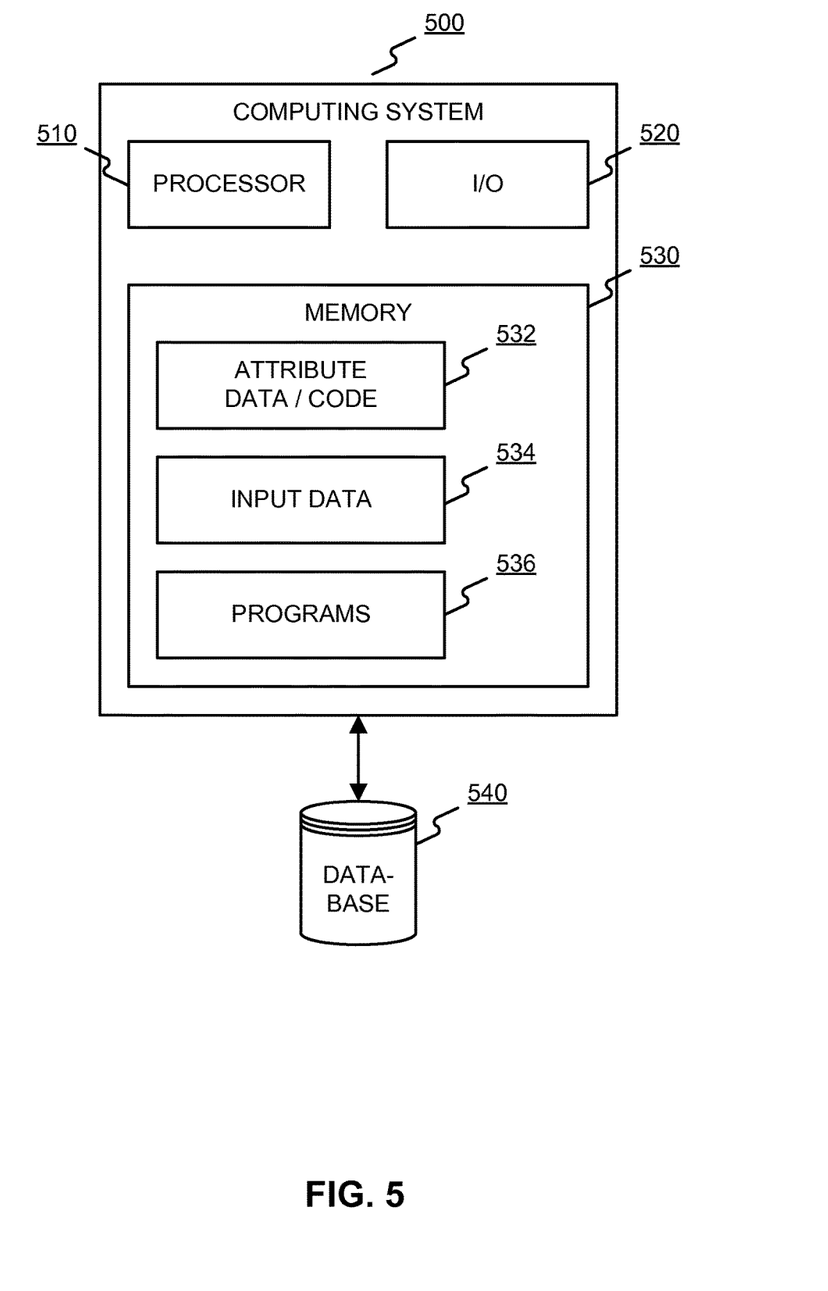
FIG. 5 is a block diagram of an exemplary computer system, consistent with disclosed embodiments.

FIG. 5 shows a diagram of an exemplary computing system 500 illustrating a computing system configuration that may be associated with FSP device 420, AC server 430, and/or user device 410, consistent with disclosed embodiments. In one embodiment, computing system 500 may have one or more processors 510, one or more memories 530, and one or more input/output (I/O) devices 520. In some embodiments, computing system 500 may take the form of a server, general-purpose computer, a mainframe computer, laptop, smartphone, mobile device, or any combination of these components. In certain embodiments, computing system 500 (or a system including computing system 500) may be configured as a particular apparatus, system, and the like based on the storage, execution, and/or implementation of the software instructions that perform one or more operations consistent with the disclosed embodiments. Computing system 500 may be standalone, or it may be part of a subsystem, which may be part of a larger system.

Processor 510 may include one or more known processing devices, such as a microprocessor from the Pentium™ or Xeon™ family manufactured by Intel™, the Turion™ family manufactured by AMD™, or any of various processors manufactured by Sun Microsystems. Processor 510 may constitute a single core or multiple core processor that executes parallel processes simultaneously. For example, processor 510 may be a single core processor configured with virtual processing technologies. In certain embodiments, processor 510 may use logical processors to simultaneously execute and control multiple processes. Processor 510 may implement virtual machine technologies, or other known technologies to provide the ability to execute, control, run, manipulate, store, etc. multiple software processes, applications, programs, etc. In another embodiment, processor 510 may include a multiple-core processor arrangement (e.g., dual, quad core, etc.) configured to provide parallel processing functionalities to allow computing system 500 to execute multiple processes simultaneously. One of ordinary skill in the art would understand that other types of processor arrangements could be implemented that provide for the capabilities disclosed herein. The disclosed embodiments are not limited to any type of processor(s) configured in computing system 500.

Memory 530 may include one or more storage devices configured to store instructions used by processor 510 to perform functions related to the disclosed embodiments. For example, memory 530 may be configured with one or more software instructions, such as program(s) 536 that may perform one or more operations when executed by processor 510. The disclosed embodiments are not limited to separate programs or computers configured to perform dedicated tasks. For example, memory 530 may include a program 536 that performs the functions of computing system 500, or program 536 could comprise multiple programs. Additionally, processor 510 may execute one or more programs located remotely from computing system 500. For example, FSP device 420, AC server 430, or user device 410, may, via computing system 500 (or variants thereof), access one or more remote programs that, when executed, perform functions related to certain disclosed embodiments. Processor 510 may further execute one or more programs located in database 540. In some embodiments, programs 536 may be stored in an external storage device, such as a cloud server located outside of computing system 500, and processor 510 may execute programs 536 remotely.

Programs executed by processor 510 may cause processor 510 to execute one or more processes related to standardized coding and deployment of common attributes across multiple financial decisioning systems and production environments. Programs executed by processor 510 may further cause processor 510 to execute one or more processes related to computerized decisioning in the financial services industry. Programs executed by processor 510 may also cause processor 510 to execute one or more processes related to financial services provided to users including, but not limited to, processing credit and debit card transactions, checking transactions, fund deposits and withdrawals, transferring money between financial accounts, lending loans, processing payments for credit card and loan accounts, processing ATM cash withdrawals, or any other activity that implications financial decisioning.

Memory 530 may also store data that may reflect any type of information in any format that the system may use to perform operations consistent with the disclosed embodiments. Memory 530 may store instructions to enable processor 510 to execute one or more applications, such as server applications, an attribute calculation application, network communication processes, and any other type of application or software. Alternatively, the instructions, application programs, etc., may be stored in an external storage (not shown) in communication with computing system 500 via communication network 540 or any other suitable network. Memory 530 may be a volatile or non-volatile, magnetic, semiconductor, tape, optical, removable, non-removable, or other type of storage device or tangible (e.g., non-transitory) computer-readable medium.

Memory 530 may include attribute data and/or code 532. Attribute data and/or code 532 may include information, or program code to generate information, related to one or more attributes configured to assist in financial decision-making. In one example, a credit attribute may be a calculation that summarizes raw credit data for an individual into one value that can be leveraged for credit decisioning. As discussed above, a simple example of a credit attribute may be a number of credit trades where if an individual had three credit cards, one mortgage, one student loan, and two auto trades, the summarized attribute number of credit trades may be "7." Thus, in some embodiments, systems consistent with disclosed embodiments may conduct credit decisioning based on the credit attribute. For example, systems consistent with disclosed embodiments may only automatically approve a credit application if the summarized attribute number of credit trades is below a threshold value. Accordingly, in the above example, systems consistent with disclosed embodiments may decide not to automatically approve a credit application for the individual associated with the attribute number of credit trades of "7" where the corresponding threshold is "6" or lower. As discussed above, an attribute may comprise complex summarizations due to, for example in the context of credit decisioning, the amount of information available to the financial institution from different credit data sources. Thus, systems consistent with disclosed embodiments may conduct decisioning based on any number criteria, standards, benchmarks, etc. beyond that of thresholds. Additionally or alternatively, attribute data and/or code 532 may be stored in database 540 or in an external storage (not shown) in communication with computing system 500 via network 540 or any other suitable network.

Memory 530 may further include input data 534. Input data 534 may include information used to calculate attributes using the attribute code 532. For example, input data 534 may include clients' account information, debit or credit card information, history of purchase transactions, financial statements, credit score, risk profile, username and password, debit card PIN, home and work locations, and/or biometric information. In some embodiments, database 540 may further provide input data to FSP device 420 or AC server 430, or may permit FSP device 420 or AC server 430 to access input data stored in database 540 for purposes of calculating or analyzing an attribute. Database 540 may provide this information to FSP device 420 or AC server 430 via network 440. Alternatively, FSP device 420 or AC server 430 may access the input data stored in database 540 via network 440. Processor 510 may analyze input data 534, using the attribute data and/or code 532 to calculate attribute values.

I/O devices 520 may be one or more device that is configured to allow data to be received and/or transmitted by computing system 500. I/O devices 520 may include one or more digital and/or analog communication devices that allow computing system 500 to communicate with other machines and devices, such as other components of system 400 shown in FIG. 4. For example, computing system 500 may include interface components, which may provide interfaces to one or more input devices, such as one or more keyboards, mouse devices, and the like, which may enable computing system 500 to receive input from an operator of FSP device 420 (not shown).

Computing system 500 may also comprise one or more database(s) 540. Alternatively, computing system 500 may be communicatively connected to one or more database(s) 540. Computing system 500 may be communicatively connected to database(s) 540 through network 440. Database 540 may include one or more memory devices that store information and are accessed and/or managed through computing system 500. By way of example, database(s) 540 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. Database 540 may include computing components (e.g., database management system, database server, etc.) configured to receive and process requests for data stored in memory devices of database(s) 240 and to provide data from database 540.

As discussed above, FSP device 420 may include at least one computing system 500. Further, although sometimes discussed here in relation to FSP 500, it should be understood that variations of computing system 500 may be employed by other components of system 400, including AC server 430 and user device 410. Computing system 500 may be a single server or may be configured as a distributed computer system including multiple servers or computers that interoperate to perform one or more of the processes and functionalities associated with the disclosed embodiments.

Figure 6A:
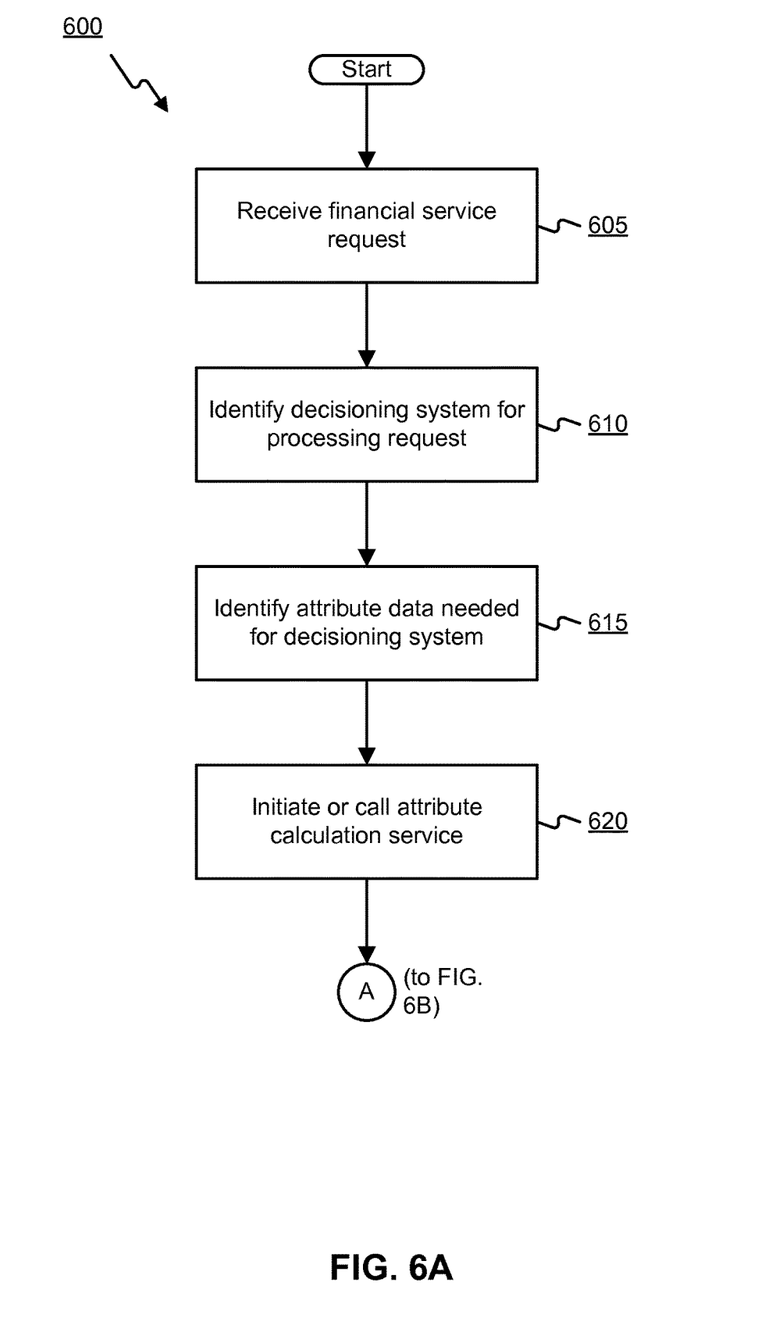
FIGS. 6A-B are flowcharts of an exemplary process for financial service request processing using standardized attributes, consistent with disclosed embodiments.
Figure 6B:
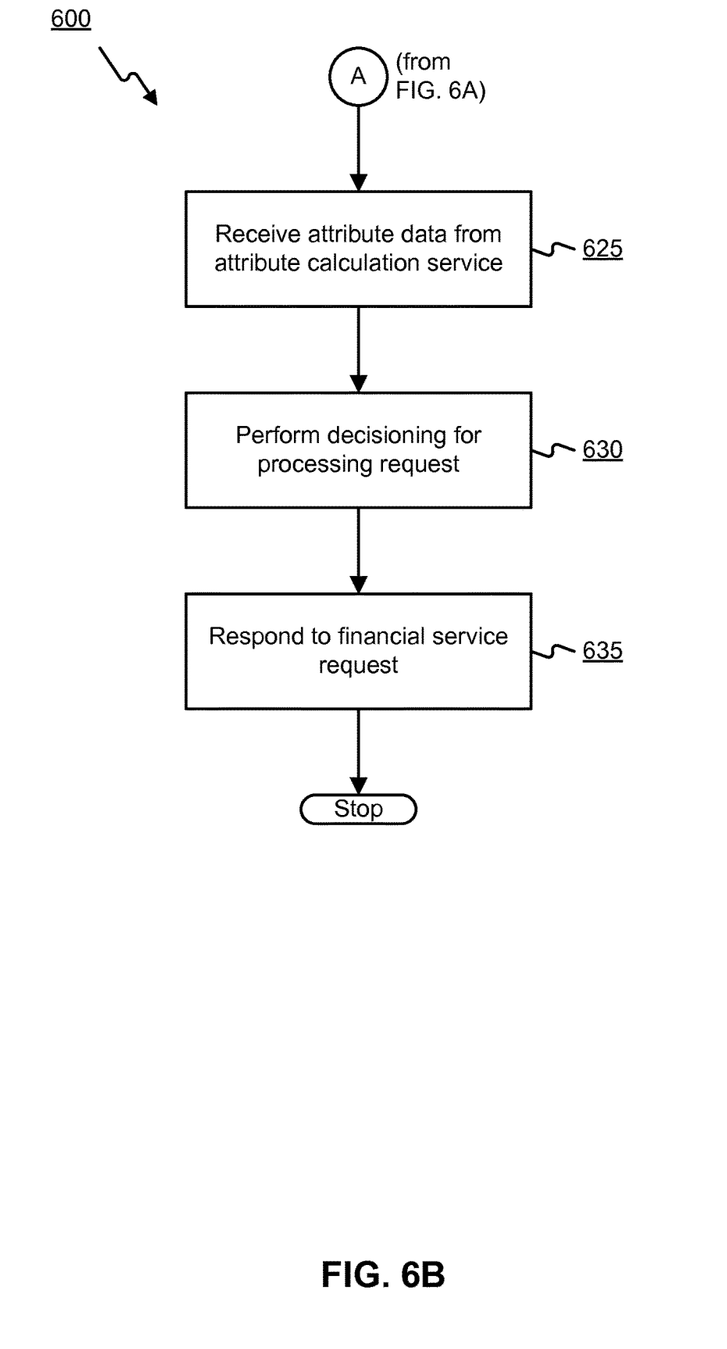

FIGS. 6A-B are flowcharts of an exemplary process 600 for processing financial service requests using standardized attributes, consistent with disclosed embodiments. With reference to FIG. 6A, at step 605, FSP device 420 may receive a financial service request. The financial request may be from a consumer, e.g., originating at a device such as user device 410. The request could correspond to any financial service, including a credit application, an account opening or closing request, a transaction request (e.g., deposit, withdrawal), a card transaction authorization message (e.g., as part of a credit or debit transaction), a request related to managing an investment asset or asset portfolio, etc. At step 610, FSP device 420 may identify one or more decisioning systems to be used for processing the request. For example, different decisioning systems may be used for marketing services, account opening services, account management services, or other actions of a financial institution. Depending on the type of request, the appropriate decisioning system may be engaged to process the request.

At step 615, the FSP device 420 may identify the data associated with processing the request using the selected decisioning system(s). For example, FSP device 420 may identify a stored a lookup table including a list of variable names required as input to the decisioning system being utilized. In some embodiments, one or more variable names may correspond to attributes. As an example, FSP device 420 may identify, access, and provide credit decisioning systems selected based on received loan request with a credit attribute configured to summarize raw credit data for an individual. It is to be understood that an attribute may depend on varied input, such as any financial data, personal data, aggregate data, regulatory inputs, company policies, etc.

Thus, in some embodiments, FSP device 420 may identify that one or more variables associated with processing the request may be an attribute that should become provided to an attribute calculation service. At step 620, FSP device may initiate an attribute calculation service for calculating one or more attribute values corresponding to the variables associated with processing the request. In some embodiments, the attribute calculation service may be a process that is executing locally on FSP device 420. In such embodiments, FSP device 420 may create (or wake up) an attribute calculation process and provide the input data to that process for calculating the attributes for the selected decisioning system(s). In alternate embodiments, the attribute calculation service may execute remotely on AC server 430. In such embodiments, FSP device 420 may create and send a remote procedure call, such as an application programming interface (API) call to AC server 430. For example, FSP device 420 may use a standard HTTP, POST, or GET message to send the API call, and may include input variables in the message body in extensible markup language (XML) format. In response, AC server 430 may instantiate an attribute calculation process and provide the input data to that process for calculating the attributes for the decisioning system.

In some embodiments, the same attribute calculation service may be used for calculating attributes, regardless of the decisioning system used to process the financial service request or the type or nature of the financial service request. In some embodiments, the attribute calculation service may be hosted at a central server, such that any changes to the attribute calculation effected at the central server may automatically and simultaneously propagated to all decisioning systems for all types of financial service requests. In some embodiments, the system may have in place an update system that automatically updates all computing systems that provide attribute calculation services, so that all attribute calculation services operate using the same attribute models to provide uniform, consistent results.

With reference to FIG. 6B, at step 625, FSP device 420 may receive the calculated attribute data from the attribute calculation service. At step 630, using the attribute data, the decisioning system at FSP device 420 may perform decisioning to process the financial service request. And at step 635, FSP device 420 may respond to the financial service request based on the results of the selected decisioning system(s).

In some examples, some or all of the logic for the above-described techniques may be implemented as a computer program or application or as a plug in module or sub component of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been referred to herein for ease of discussion, it is to be understood that consistent with disclosed embodiments another entity may provide such services in conjunction with or separate from a financial service provider.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. An attribute management system, comprising:
one or more memory devices storing instructions; and
one or more hardware processors configured to execute the instructions to:
  receive a request;
  identify a decisioning system, among a plurality of decisioning systems, associated with a plurality of services, for processing the request based on a service associated with the request;
  determine that an attribute is required by the identified decisioning system;
  initiate, using an application programming interface call to a central attribute calculation server, an attribute calculation service, separate from the decisioning systems, for determining an attribute value for the attribute, the attribute calculation service being configured to serve the decisioning systems;
  determine, by the attribute calculation service, the attribute value based on an attribute model associated with the attribute;
  receive the attribute value from the attribute calculation service; and
  process the request using the received attribute value and the identified decisioning system based on a comparison of the received attribute value and a threshold attribute value.

2. The system of claim 1, wherein the attribute calculation service is initiated independent of the attribute determined to be required for processing the request using the decisioning system.

3. The system of claim 1, wherein the attribute calculation service is a process executing locally on the attribute management system.

4. The system of claim 1, wherein the request is a financial service request.

5. The system of claim 1, wherein the request relates to at least one of marketing, loan application processing, or account management.

6. The system of claim 1, wherein the attribute calculation service is implemented based on encrypted source code that is accessible to one or more third-party systems.

7. The system of claim 6, wherein the encrypted source code is published after testing for computing security and analytical value of the attribute.

8. The system of claim 7, wherein the testing is performed after receiving a user request to explore the analytical value of the attribute.

9. The system of claim 1, wherein the attribute calculation service is coded at an exploratory environment, promoted to a sandbox environment, and published for a plurality of decisioning systems at a production environment.

10. An attribute management method, comprising:
receiving a request;
identifying a decisioning system, among a plurality of decisioning systems associated with a plurality of services, for processing the request based on a service associated with the request;
determining, via one or more processors, that an attribute is required by the identified decisioning system;
initiating, using an application programming interface call to a central attribute calculation server, an attribute calculation service, separate from the decisioning systems, for determining an attribute value for the attribute, the attribute calculation service being configured to serve the decisioning systems;
determining, by the attribute calculation service, the attribute value based on an attribute model associated with the attribute;
receiving the attribute value from the attribute calculation service; and
processing the request using the received attribute value and the identified decisioning system based on a comparison of the received attribute value and a threshold attribute value.

11. The method of claim 10, wherein the attribute calculation service is initiated independent of the attribute determined to be required for processing the request using the decisioning system.

12. The method of claim 10, wherein the attribute calculation service is a process executing locally on an attribute management system performing the method.

13. The method of claim 10, wherein the request is a financial service request.

14. The method of claim 10, wherein the request relates to at least one of marketing, loan application processing, or account management.

15. The method of claim 10, wherein the attribute calculation service is implemented based on encrypted source code that is accessible to one or more third-party systems.

16. The method of claim 15, wherein the encrypted source code is published after testing for computing security and analytical value of the attribute.

17. The method of claim 16, wherein the testing is performed after receiving a user request to explore the analytical value of the attribute.

18. The method of claim 17, wherein the attribute calculation service is coded at an exploratory environment, promoted to a sandbox environment, and published for a plurality of decisioning systems at a production environment.

19. A non-transitory computer-readable medium storing computer-executable attribute management instructions that, when executed by a computer, cause the computer to perform operations comprising:

receive a request;

identify a decisioning system, among a plurality of decisioning systems associated with a plurality of services, for processing the request based on a service associated with the request;

determine that an attribute is required by the identified decisioning system;

initiate, using an application programming interface call to a central attribute calculation server, an attribute calculation service, separate from the plurality of decisioning systems, for determining an attribute value for the attribute, the attribute calculation service being configured to serve the decisioning systems;

determine, by the attribute calculation service, the attribute value based on an attribute model associated with the attribute;

receive the attribute value from the attribute calculation service; and process the request using the received attribute value and the identified decisioning system based on a comparison of the received attribute value and a threshold attribute value.

20. The medium of claim 19, wherein the attribute calculation service is initiated independent of the attribute determined to be required.

21. The medium of claim 19, wherein the attribute calculation service is a process executing locally on the attribute management system.

22. The medium of claim 19, wherein the request is a financial service request.

23. The medium of claim 19, wherein the request relates to at least one of marketing, loan application processing, or account management.

24. The medium of claim 19, wherein the attribute calculation service is implemented based on encrypted source code that is accessible to a third-party system.

25. The medium of claim 24, wherein the encrypted source code is published after testing for computing security and analytical value of the attribute.

26. The medium of claim 25, wherein the testing is performed after receiving a user request to explore the analytical value of the attribute.

27. The medium of claim 19, wherein the attribute calculation service is coded at an exploratory environment, promoted to a sandbox environment, and published for a plurality of decisioning systems at a production environment.

* * * * *